US011481206B2

(12) United States Patent
Bulusu et al.

(10) Patent No.: US 11,481,206 B2
(45) Date of Patent: Oct. 25, 2022

(54) CODE UPDATE IN SYSTEM MANAGEMENT MODE

(71) Applicant: Microsoft Technology Licensing, LLC, Redmond, WA (US)

(72) Inventors: Mallik Bulusu, Bellevue, WA (US); Muhammad A. Ahmed, Redmond, WA (US); Bryan D. Kelly, Carnation, WA (US); Ramakoti R. Bhimanadhuni, Bothell, WA (US); Pingfan Song, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 373 days.

(21) Appl. No.: 16/532,277

(22) Filed: Aug. 5, 2019

(65) Prior Publication Data

US 2020/0364041 A1 Nov. 19, 2020

Related U.S. Application Data

(60) Provisional application No. 62/849,092, filed on May 16, 2019.

(51) Int. Cl.
 *G06F 8/65* (2018.01)
 *G06F 9/46* (2006.01)
 (Continued)

(52) U.S. Cl.
 CPC ............ *G06F 8/65* (2013.01); *G06F 9/44589* (2013.01); *G06F 9/45533* (2013.01);
 (Continued)

(58) Field of Classification Search
 CPC ......... H04L 9/0877; G06F 8/65; G06F 8/656; G06F 9/4411; G06F 9/4418; G06F 9/44505; G06F 9/4812; G06F 9/3851; G06F 9/461
 See application file for complete search history.

(56) References Cited

U.S. PATENT DOCUMENTS 6,418,498 B1 * 7/2002 Martwick ............. G06F 9/4812
 710/269
6,615,365 B1   9/2003 Jenevein et al.
 (Continued)

OTHER PUBLICATIONS

De Souza et al. "SMM-based hypervisor integrity measurement". Nov. 3, 2015. IEEE 2nd International Conference on Cyber Security and Cloud Computing (Year: 2015).*

(Continued)

*Primary Examiner* — Lewis A Bullock, Jr.
*Assistant Examiner* — Gilles R Kepnang
(74) *Attorney, Agent, or Firm* — Alleman Hall Creasman & Tuttle LLP (57) ABSTRACT

A computing device is provided, including memory storing an instruction storage location. The computing device may further include a processor system including a plurality of processor threads. The processor system may suspend execution of one or more respective processor threads of the plurality of processor threads. The processor system may store one or more respective processor thread contexts of the one or more processor threads in the memory. The processor system may enter a system management mode (SMM). The processor system may determine that the instruction storage location includes a code update instruction. The processor system may perform a code update based on the code update instruction. The processor system may exit the SMM. The processor system may retrieve the one or more processor thread contexts from the memory and resume execution of the one or more processor threads without rebooting the computing device.

11 Claims, 6 Drawing Sheets

(51) Int. Cl.
  *G06F 9/455* (2018.01)
  *G06F 9/445* (2018.01)
  *G06F 9/48* (2006.01)

(52) U.S. Cl.
  CPC .............. *G06F 9/461* (2013.01); *G06F 9/485* (2013.01); *G06F 9/4812* (2013.01); *G06F 2209/462* (2013.01)

(56) References Cited

U.S. PATENT DOCUMENTS

| | | | |
|---|---|---|---|
| 7,454,547 B1 | | 11/2008 | Nallagatla et al. |
| 9,176,752 B1 | * | 11/2015 | Marr ................... H04L 9/0877 |
| 10,104,185 B1 | | 10/2018 | Sharifi Mehr et al. |
| 2003/0196096 A1 | | 10/2003 | Sutton |
| 2004/0098715 A1 | | 5/2004 | Aghera et al. |
| 2004/0199911 A1 | | 10/2004 | Lo et al. |
| 2004/0255286 A1 | * | 12/2004 | Rothman ................... G06F 8/65 717/168 |
| 2006/0075001 A1 | | 4/2006 | Canning |
| 2007/0143528 A1 | | 6/2007 | Przybylek |
| 2008/0104132 A1 | | 5/2008 | Toner |
| 2008/0222449 A1 | * | 9/2008 | Ramgarajan .......... G06F 11/073 714/5.11 |
| 2009/0144538 A1 | | 6/2009 | Duda et al. |
| 2009/0172372 A1 | * | 7/2009 | Kumar ................... G06F 9/4812 712/244 |
| 2010/0031366 A1 | | 2/2010 | Knight et al. |
| 2011/0055469 A1 | * | 3/2011 | Natu ..................... G06F 9/3851 711/E12.078 |
| 2011/0179311 A1 | * | 7/2011 | Nachimuthu ....... G06F 11/3676 714/E11.144 |
| 2011/0252413 A1 | | 10/2011 | Maeda |
| 2011/0271268 A1 | * | 11/2011 | Dang ................... G06F 9/4486 717/168 |
| 2013/0031538 A1 | | 1/2013 | Skalsky |
| 2014/0281092 A1 | * | 9/2014 | Jayakumar .......... G06F 11/0772 710/269 |
| 2016/0180099 A1 | | 6/2016 | Potlapally et al. |
| 2017/0090909 A1 | | 3/2017 | Guo et al. |
| 2017/0242598 A1 | * | 8/2017 | Nijhawan ........... G06F 12/1466 |
| 2018/0032349 A1 | | 2/2018 | Bhimanadhuni et al. |
| 2019/0042752 A1 | | 2/2019 | Mihm et al. |
| 2019/0243634 A1 | | 8/2019 | Lewis |
| 2020/0082088 A1 | | 3/2020 | Muthukumaran et al. |
| 2020/0257521 A1 | | 8/2020 | Jayakumar et al. |
| 2021/0240489 A1 | | 8/2021 | Xie et al. |

OTHER PUBLICATIONS

"International Search Report and Written Opinion Issued in PCT Application No. PCT/US20/028597", dated Jul. 3, 2020, 14 Pages.
"Unified Extensible Firmware Interface (UEFI) Framework UEFI Overview", Retrieved from: https://software.intel.com/sites/default/files/m/4/1/c/3/e/40434-Unified_Extensible_Firmware_Interface_28UEFI_29_Framework_Overview.pptx, Retrieved Date: Apr. 23, 2020, 43 Pages.
"Unified Extensible Firmware Interface Forum", Retrieved from: http://web.archive.org/web/20200109232652/https://uefi.org/specifications, Jan. 9, 2020, 4 Pages.
Regenscheid, Andrew, "BIOS Protection Guidelines for Servers", In NIST Special Publication 800-147B, Aug. 2014, 32 Pages.
Rosenbaum, et al., "A Tour Beyond BIOS into UEFI Secure Boot", In White Paper of Intel, Jul. 2012, 49 Pages.
Svoboda, David, "SEI CERT C Coding Standard", Retrieved from: https://wiki.sei.cmu.edu/confluence/display/c/SEI+CERT+C+Coding+Standard, Dec. 5, 2018, 3 Pages.
Yao, et al., "A Tour Beyond BIOS—Capsule Update and Recovery in EDK II", In White Paper of Intel, Dec. 2016, 43 Pages.
Yao, et al., "A Tour Beyond BIOS—Security Design Guide in EDK II", In White Paper of Intel, Sep. 2016, 33 Pages.
Yao, et al., "A Tour Beyond BIOS—Security Enhancement to Mitigate Buffer Overflow in UEFI", In White Paper of Intel, Oct. 2016, 43 Pages.
Yao, et al., "A Tour Beyond BIOS Memory Map and Practices in UEFI BIOS", In White Paper of Intel, Jan. 31, 2016, 40 Pages.
Yao, et al., "A Tour Beyond BIOS Secure SMM Communication in the EFI Developer Kit II", In White Paper of Intel, Apr. 26, 2016, 32 Pages.
"Invitation to Pay Additional Fee Issued in PCT Application No. PCT/US2021/014029", Mailed Date: May 18, 2021, 12 Pages.
Viega, et al., "Building Secure Software: Race Conditions", Retrieved From: https://www.informit.com/articles/article.aspx?p=23947&seqNum=3, Nov. 2, 2001, 5 Pages.
"International Search Report and Written Opinion Issued in PCT Application No. PCT/US21/014029", dated Jul. 9, 2021, 16 Pages.
"Non Final Office Action Issued in U.S. Appl. No. 16/874,276", dated Dec. 13, 2021, 10 Pages.

* cited by examiner

CODE UPDATE IN SYSTEM MANAGEMENT MODE

CROSS REFERENCE TO RELATED APPLICATIONS

This application claims priority to U.S. Provisional Patent Application Ser. No. 62/849,092, filed May 16, 2019, the entire contents of which is hereby incorporated herein by reference for all purposes.

BACKGROUND

Computing devices such as servers used in cloud computing environments typically have system firmware that manages the functions of the hardware components of the server computing devices. It may sometimes be desirable to update this firmware, for example, to fix security vulnerabilities, adjust settings, accommodate hardware changes, fix bugs in functionality, enhance reliability and serviceability features, or perform other types of updates.

SUMMARY

According to one aspect of the present disclosure, a computing device is provided, including memory storing an instruction storage location. The computing device may further include a processor system including a plurality of processor threads. The processor system may be configured to suspend execution of one or more respective processor threads of the plurality of processor threads. The processor system may be further configured to store one or more respective processor thread contexts of the one or more processor threads in the memory. The processor system may be further configured to enter a system management mode (SMM). The processor system may be further configured to determine that the instruction storage location includes a code update instruction. The processor system may be further configured to perform a code update based on the code update instruction. The processor system may be further configured to exit the SMM. The processor system may be further configured to retrieve the one or more processor thread contexts from the memory and resume execution of the one or more processor threads without rebooting the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

According to existing methods for updating firmware such as a basic input output system (BIOS) of a computing device such as a server computing device, the computing device is rebooted as a part of the updating process. According to one such existing method, the computing device enters system management mode, uses a flash utility to store a new version of the BIOS in flash memory, then performs a reboot and loads the new version of the BIOS from flash memory, whereupon the new version of the BIOS is executed.

While the server computing device is in the process of shutting down and restarting, its usability is interrupted. In addition, when virtual machines are run on the server computing device, those virtual machines are typically migrated to other server computing devices during the firmware update process. Rebooting a server computing device and migrating a virtual machine are both time-consuming processes that increase the cost of applying a firmware update at a server computing device. Similar usability interruption challenges exist when updating firmware of computing devices other than server computing devices, as well.

Figure 1A:
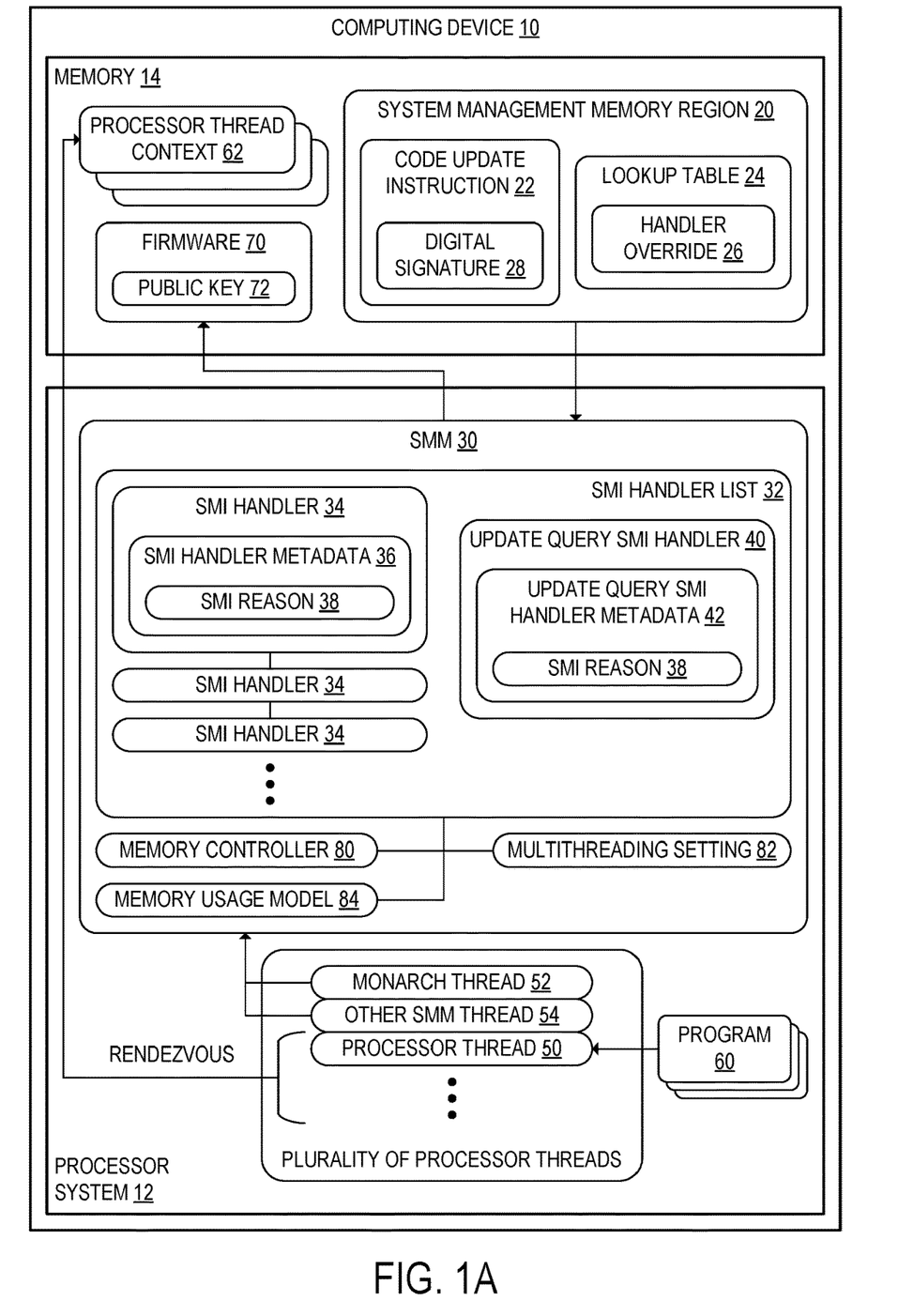
FIGS. 1A-1B schematically show an example computing device at which a code update may be performed, according to one embodiment of the present disclosure.
Figure 1B:
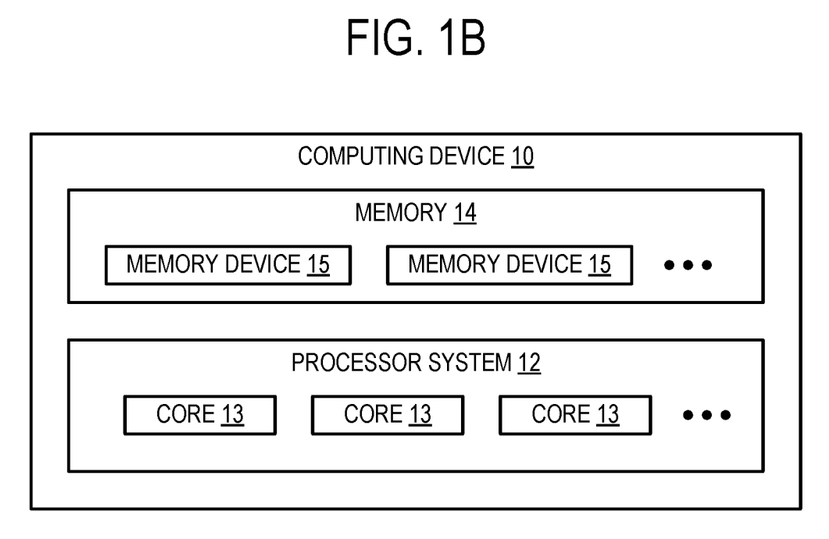

In order to address the above issues, the following systems, devices, and methods are provided. FIGS. 1A-1B schematically show a computing device 10, according to one example embodiment. The computing device 10 may include a processor system 12. As shown in FIG. 1A, the processor system 12 may include a plurality of processor threads 50. The plurality of processor threads 50 may be instantiated on a plurality of processor cores 13 included in the processor system 12, as shown in FIG. 1B.

The computing device 10 may further include memory 14. The memory 14 may include one or more physical memory devices 15, as shown in FIG. 1B. Each of the memory devices 15 may be a volatile memory device or a non-volatile memory device. As shown in FIG. 1A, the memory 14 may be operatively coupled to the processor system 12 such that the processor system 12 may store data in the memory 14 and retrieve data from the memory 14. In some embodiments, the functions of the processor system 12 and the memory 14 may be instantiated across a plurality of operatively coupled computing devices 10. For example, the computing device 10 may be a server computing device operatively coupled to one or more other computing devices 10 in a data center, each of which may perform some or all of the functions of the processor system 12 or memory 14 discussed below.

The computing device 10 may have firmware 70, which may be stored in the memory 14. For example, the firmware 70 may be a Basic Input/Output System (BIOS) or a Unified Extensible Framework Interface (UEFI). In addition, the firmware 70 may include settings of one or more additional hardware devices operatively coupled to processor system 12 and/or the memory 14 of the computing device 10, such as one or more input devices, one or more output devices, or one or more networking devices.

During normal operation of the computing device 10, a plurality of processor threads 50 may be concurrently executed on the computing device 10 to run a plurality of programs 60. For example, the plurality of processor threads 50 may include one or more virtual machine (VM) processor threads on which one or more virtual machines are run. As another example, the plurality of programs 60 may include one or more operating system programs. The plurality of processor threads 50 may be run on a plurality of processor cores 13 included in the processor system 12. The plurality of processor threads 50 and cores 13 may allow computations performed by the processor system 12 to be performed in parallel.

The processor system 12 may be configured to suspend execution of one or more processor threads 50 of the plurality of processor threads 50. The processor threads 50 run until a rendezvous barrier is reached for each thread, at which point the processor threads 50 are quiesced, i.e., temporarily suspended. Subsequently to suspending the execution of the one or more processor threads 50, the processor system 12 may be further configured to store one or more respective processor thread contexts 62 of the one or more processor threads 50 in the memory 14. Each processor thread context 62 may be a state of the processor thread 50 when execution of the processor thread 50 has been suspended. Thus, each of the one or more processor threads 50 for which execution is suspended may be stored such that they can resume execution after performing a code update, as discussed in further detail below. In some embodiments, one or more additional copies of the one or more processor thread contexts 62 may be made. In such embodiments, the one or more additional copies may be stored on one or more other computing devices 10 as backup copies.

After storing the one or more processor thread contexts 62, the processor system 12 may be further configured to enter a system management mode (SMM) 30. The SMM 30 may have the highest level of administrative privileges on the computing device 10. As a result of having the highest level of administrative privileges, the SMM 30 may modify the firmware 70, as discussed in further detail below. The processor system 12 may be configured to suspend execution of the one or more processor threads 50 and enter the SMM 30 without rebooting the computing device 10. Thus, costs associated with migrating the VMs to another computing device and rebooting the computing device 10 may be avoided.

Figure 2A:
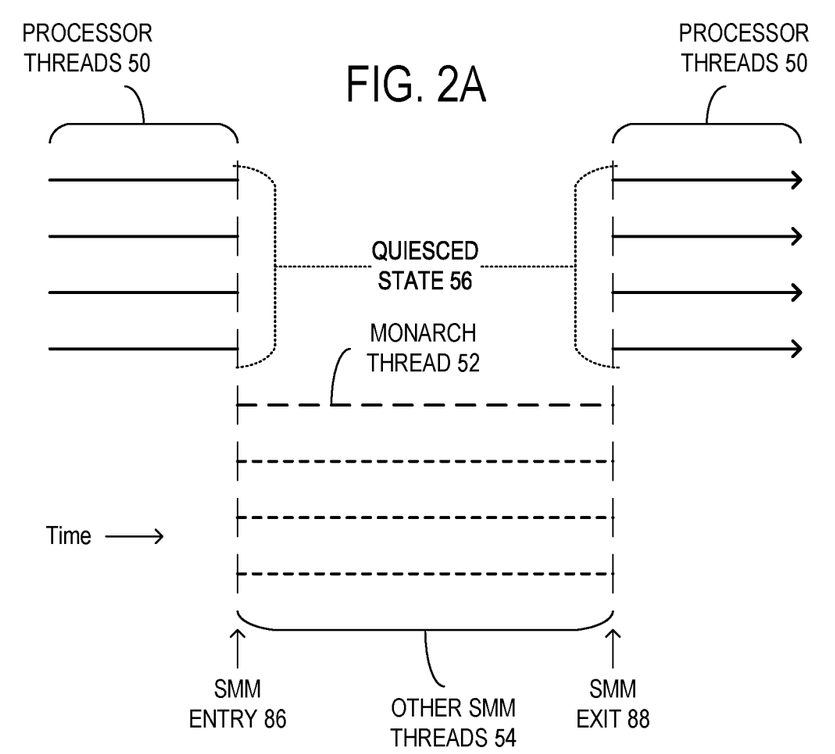
FIGS. 2A-2B show example processor threads before, during, and after a period of time in which the computing device is in system management mode, according to the embodiment of FIGS. 1A-1B.

In some embodiments, when the processor system 12 is in the SMM 30, the processor system 12 may include a monarch thread 52 configured to allocate one or more other SMM threads 54. The monarch thread 52 may be the processor thread 50 selected to execute a plurality of system management interrupt (SMI) handlers 34, as discussed below. The monarch thread 52 is shown in the example of FIG. 2A, which shows a plurality of processor threads 50 before, during, and after a period of time in which the processor system 12 is in the SMM 30. The plurality of processor threads 50 may, for example, include one or more VM processor threads on which the processor system 12 runs one or more VMs.

In the example of FIG. 2A, the processor system 12 may perform an SMM entry 86 after the respective processor thread contexts 62 of the plurality of processor threads 50 are stored in the memory 14. The SMM entry point may be a rendezvous point at which execution is stopped for each of the one or more processor threads 50. The processor system 12 may then execute a monarch thread 52 and a plurality of other SMM threads 54. While the monarch thread 52 and the plurality of other SMM threads 54 are executed, the one or more processor threads 50 may each be in a quiesced state 56.

Figure 2B:
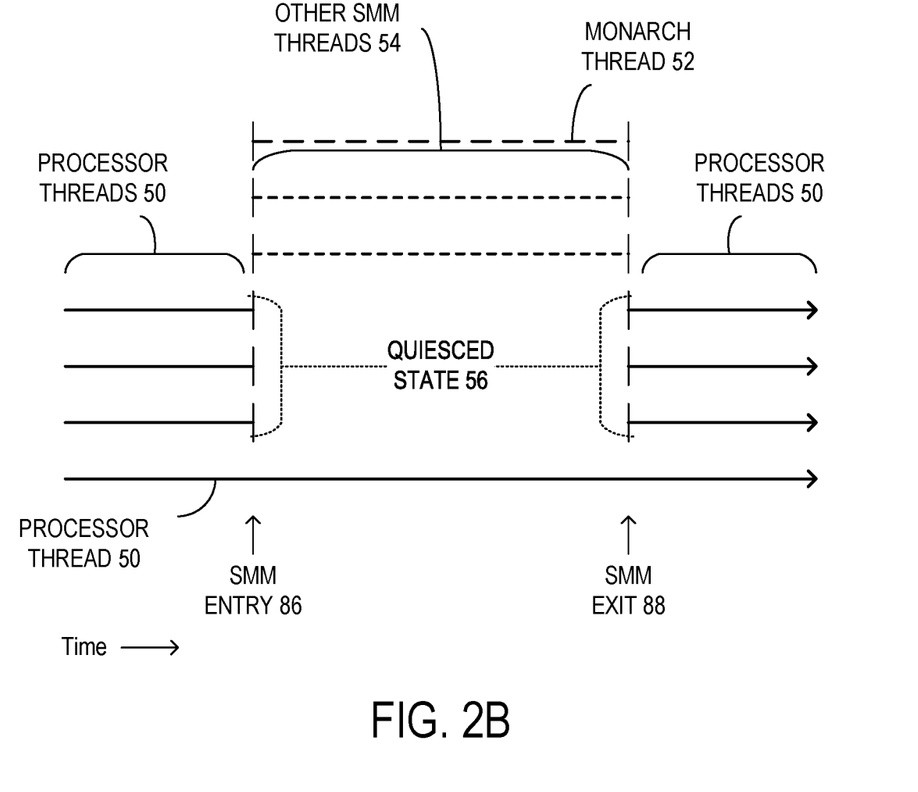

Although each processor thread 50 in the example of FIG. 2A is used to execute the SMM 30, one or more of the processor threads 50 may be left unused when the processor system 12 is in the SMM 30. Additionally or alternatively, the SMM 30 may use one or more processor threads 50 that were not used to execute the one or more programs 60 prior to entering the SMM 30. In some embodiments, as shown in the example of FIG. 2B, the processor system 12 may be further configured to execute one or more programs 60 concurrently with the SMM 30. The one or more programs 60 that the processor system 12 continues to execute may, for example, be one or more virtual machines that continue to run while a code update is performed. In the example of FIG. 2B, execution is suspended for two processor threads 50 while in the SMM 30. However, the processor system 12 continues to execute one processor thread 50 while the other processor threads 50 are used for the SMM 30.

Returning to FIG. 1A, when the processor system 12 is in the SMM 30, the plurality of processor threads 50 may be configured to execute a plurality of SMI handlers 34 included in an SMI handler list 32. Each of the SMI handlers 34 may be a piece of code executed by the processor system 12 in the SMM 30. The monarch thread 52 may assign each SMI handler 34 to another SMM thread 54, which may then execute the SMI handler 34.

In some embodiments, each SMI handler 34 of the SMI handler list 32 may include respective SMI handler metadata 36. In some embodiments, the SMI handler metadata 36 may include an SMI reason 38 indicating one or more predetermined conditions under which the SMI handler is configured to be executed while the processor system 12 is in the SMM 30. In such embodiments, for each SMI handler 34, the monarch thread 52 may determine whether the SMI reason 38 included in the SMI handler metadata 36 of that SMI handler 34 is satisfied. The monarch thread 52 may be configured to assign another SMM thread 54 to each SMI handler 34 for which the SMI reason 38 is satisfied but not assign another SMM thread 54 to each SMI handler 34 for which the SMI reason 38 is not satisfied. Thus, the processor system 12 may be configured to execute only a portion of the plurality of SMI handlers 34 included in the SMI handler list 32 while in the SMM 30.

The memory 14 of the computing device 10 may include a system management memory region 20 at which code update instructions 22 may be stored. For example, the system management memory region 20 may be a system management random access memory (SMRAM) region, which may be located in a top segment (TSEG) of the memory 14. Alternatively, the SMRAM region may be located in a DOS memory or low memory segment. While the processor system 12 is in the SMM 30, the processor system 12 may be further configured to determine that the system management memory region 20 includes a code update instruction 22. The code update instruction 22 may be an SMI handler 34.

Examples of updates that may be performed by executing the code update instruction 22 are provided below. The code update instruction 22 may be an instruction to add or remove code that is provided by the BIOS, such as an SMI handler 34. The SMI handler 34 may be added to or removed from the SMI handler list 32. Thus, the SMM 30 may modify itself when the code update instruction 22 is executed. As another example, the code update instruction 22 may be an instruction to reinitialize at least a part of a memory controller 80 for memory 14. Alternatively, the code update instruction 22 may be an instruction to change a multithreading setting 82 of the processor system 12. Changing the multithreading setting 82 may include increasing or decreasing a number of processor threads 50 executing on at least one core 13 of the processor system 12. As another example, the code update instruction 22 may be an instruction to enable or disable a core 13 of the processor system 12. As another example, the code update instruction 22 may be an instruction to change a memory usage model 84 for a policy that affects addressing mirroring. In one specific example, the memory usage model 84 may be an instruction to modify a size and/or location of a mirrored address range of the memory 14. In other embodiments, the code update instruction 22 may be an instruction to perform other types of updates.

In some embodiments, the processor system 12 may be configured to determine that the system management memory region 20 includes the code update instruction 22 at least in part by querying a lookup table 24 indicating a respective location in the memory 14 of each SMI handler 34. In some embodiments, the lookup table 24 may be stored in the system management memory region 20. In embodiments in which the processor system 12 is configured to query the lookup table 24, the SMI handler list 32 may include an update query SMI handler 40. The update query SMI handler 40 may include instructions for at least one processor thread 50 to query the lookup table 24 for a code update instruction 22. The update query SMI handler 40 may further include update query SMI handler metadata 42. Similarly to the SMI handler metadata 36 of other SMI handlers 34 included in the SMI handler list 32, the update query SMI handler metadata 42 may include an SMI reason 38 or other metadata.

Performing the code update may further include determining, for each SMI handler 34 in the SMI handler list 32, whether than SMI handler 34 is configured as a code update instruction 22. In some embodiments, the processor system 12 may determine whether each SMI handler 34 is a code update instruction 22 based on the respective SMI reasons 38 included in the SMI handler metadata 36 of the SMI handlers 34. For example, the processor system 12 may be configured to determine, for each SMI handler 34, whether that SMI handler 34 is an update query SMI handler 40 based at least in part on the SMI reason 38 included in the SMI handler metadata 36 of that SMI handler 34.

After the processor system 12 retrieves the code update instruction 22 from the system management memory region 20, the processor system 12 may be further configured to perform a code update based on the code update instruction 22. In some embodiments, performing the code update may include modifying the SMI handler list 32. In such embodiments, the processor system 12 may be configured to modify the SMI handler list 32 based on the code update instruction 22 at least in part by adding, deleting, or overwriting one or more SMI handlers 34. The processor system 12 may be further configured to update the lookup table 24 to indicate the modification to the one or more SMI handlers 34 of the SMI handler list 32. The modification may be indicated by a handler override 26 stored in the lookup table 24. For example, in embodiments in which an existing SMI handler 34 is overwritten, a handler override 26 indicating that the SMI handler 34 has been overwritten may be stored in the lookup table 24 at a location in the lookup table 24 associated with that SMI handler 34. Subsequently to modifying the SMI handler list 32, performing the code update may further include executing the plurality of SMI handlers 34 in the modified SMI handler list 32.

In some embodiments, the processor system 12 may be further configured to perform the code update in response to verifying a digital signature 28 of the code update instruction 22. In some embodiments, the code update instruction 22 may be signed with a private key. In such embodiments, the firmware 70 of the computing device 10 may include a public key 72. To confirm that the code update instruction 22 was received from a trusted source, asymmetric verification may be performed on the digital signature 28 using the public key 72 of the computing device 10. Thus, the processor system 12 may prevent third parties from making unauthorized code updates.

Subsequently to modifying the SMI handler list 32, the processor system 12 may be further configured to delete the code update instruction 22 from the system management memory region 20. Thus, the processor system 12 may free up space in the memory 14 and avoid installing the same code update twice.

The processor system 12 may be further configured to exit the SMM 30 subsequently to making the code update. When the processor system 12 performs an SMM exit 88, as shown in the example of FIGS. 2A-2B, the processor system 12 may stop executing the monarch thread 52 and the one or more other SMM threads 54. In addition, the processor system 12 may be further configured to retrieve the one or more processor thread contexts 62 from the memory 14 and resume execution of the one or more processor threads 50 for which execution was suspended. Thus, as shown in FIGS. 2A-2B, the SMM exit 88 may be an SMI rendezvous point at which execution of each of the plurality of SMI handlers 34 stops. The one or more processor threads 50 may resume execution following the code update. This allows one or more processor threads 50 for the one or more programs 60, such as one or more VMs, to resume execution on the computing device 10 without having to transfer the one or more processor threads 50 back to the computing device 10 from another computing device. As a result, interruptions in the availability of the one or more programs 60 may be reduced and costs associated with migrating the one or more programs 60 may be avoided.

Figure 3:
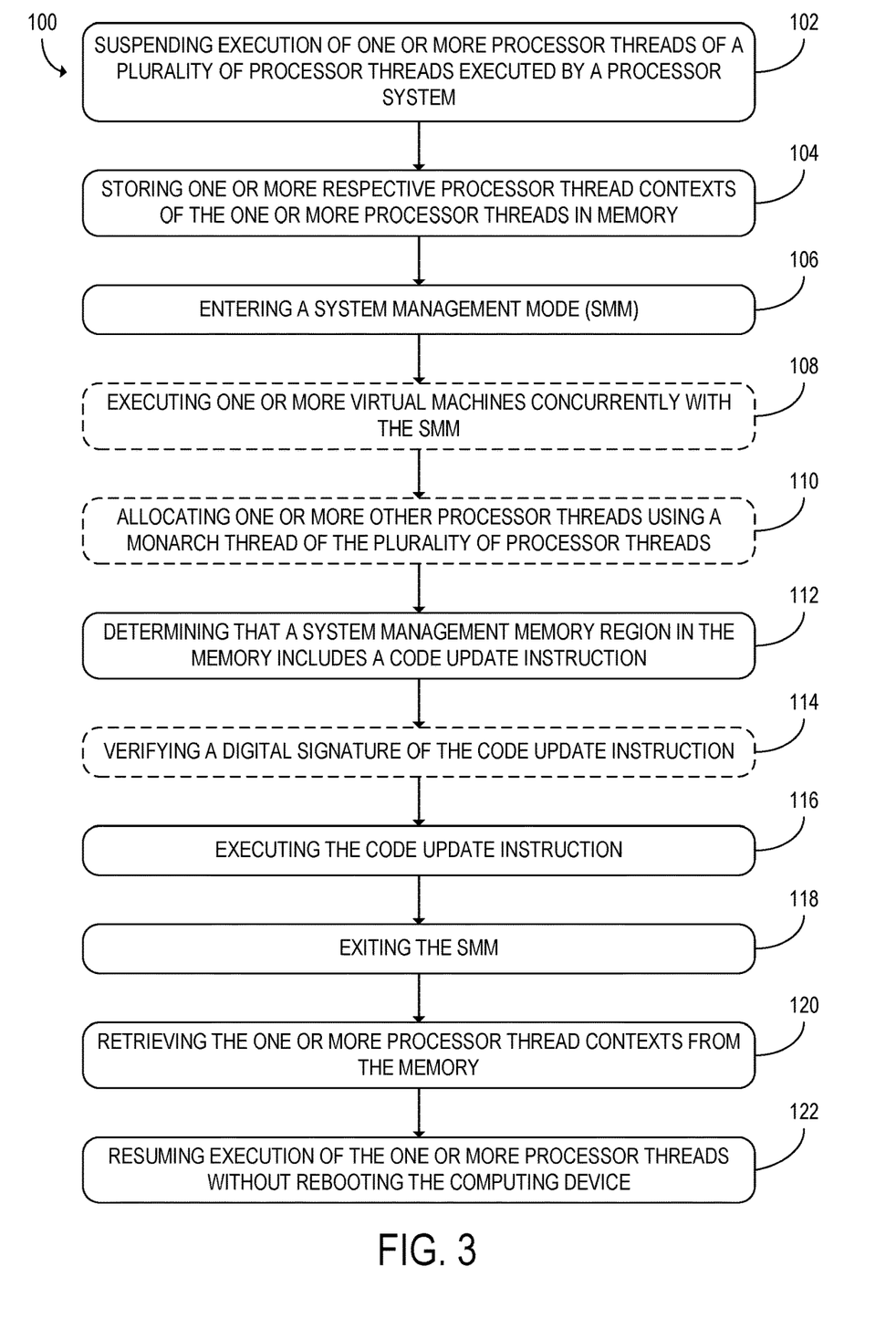
FIG. 3 shows a flowchart of an example method that may be used to update code of a computing device, according to the embodiment of FIGS. 1A-1B.

Turning now to FIG. 3, a flowchart of an example method 100 for use with a computing device is shown. The method 100 of FIG. 3 may be used with the computing device 10 of FIGS. 1A-1B or with some other computing device. At step 102, the method 100 may include suspending execution of one or more processor threads of a plurality of processor threads executed by a processor system. The plurality of processor threads executed by the processor system may, for example, instantiate one or more virtual machines.

At step 104, the method 100 may further include storing one or more respective processor thread contexts of the one or more processor threads in memory of the computing device. The processor thread context of each processor thread is the current state of the processor thread at a particular point in time. In some embodiments, a corresponding processor thread context may be stored for each processor thread of the plurality of processor threads of the processor system.

At step 106, the method 100 may further include entering a system management mode (SMM). The system management mode may have top-level administrative privileges on the computing device. The execution of the one or more processor threads may be suspended and the SMM may be entered without rebooting the computing device. Entering the SMM without rebooting the computing device may allow downtime associated with rebooting the computing device to be avoided.

In some embodiments, at step 108, the method 100 may optionally include executing one or more virtual machines concurrently with the SMM. The one or more virtual machines that are executed concurrently with the SMM in such embodiments may be executed on one or more processor threads that continue to be executed while one or more other processor threads are in the SMM.

Additionally or alternatively, the method 100 may further include, at step 110, allocating one or more other processor threads using a monarch thread of the plurality of processor threads. The monarch thread may be designated by the processor system when entering the SMM.

At step 112, the method 100 may further include determining that a system management memory region in the memory includes a code update instruction. The system management memory region may be an SMRAM region. The code update instruction may modify the firmware of the computing device when executed by the processor system. In some embodiments, the code update instruction may include a digital signature. In such embodiments, the method 100 may further include, at step 114, verifying a digital signature of the code update instruction. In some embodiments, the digital signature of the code update instruction may be asymmetrically encrypted.

At step 116, the method 100 may further include performing a code update based on the code update instruction. In embodiments in which step 114 is performed, the code update may be performed in response to verifying the digital signature.

At step 118, subsequently to performing the code update, the method 100 may further include exiting the SMM. When the processor system exits the SMM, execution of the monarch thread and the one or more other SMM threads may be stopped. The method may further include, at step 120, retrieving the one or more processor thread contexts from the memory. The one or more processor thread contexts retrieved from the memory may indicate respective states of one or more VMs prior to the SMM entry, as discussed above. At step 122, the method 100 may further include resuming execution of the one or more processor threads retrieved from the memory. Thus, in embodiments in which the one or more processor threads instantiate one or more VMs, the execution of the VMs may be resumed following a code update without having to reboot the computing device or migrate the one or more VMs from another computing device on which the one or more VMs were executed while the code update was performed.

Figure 4:
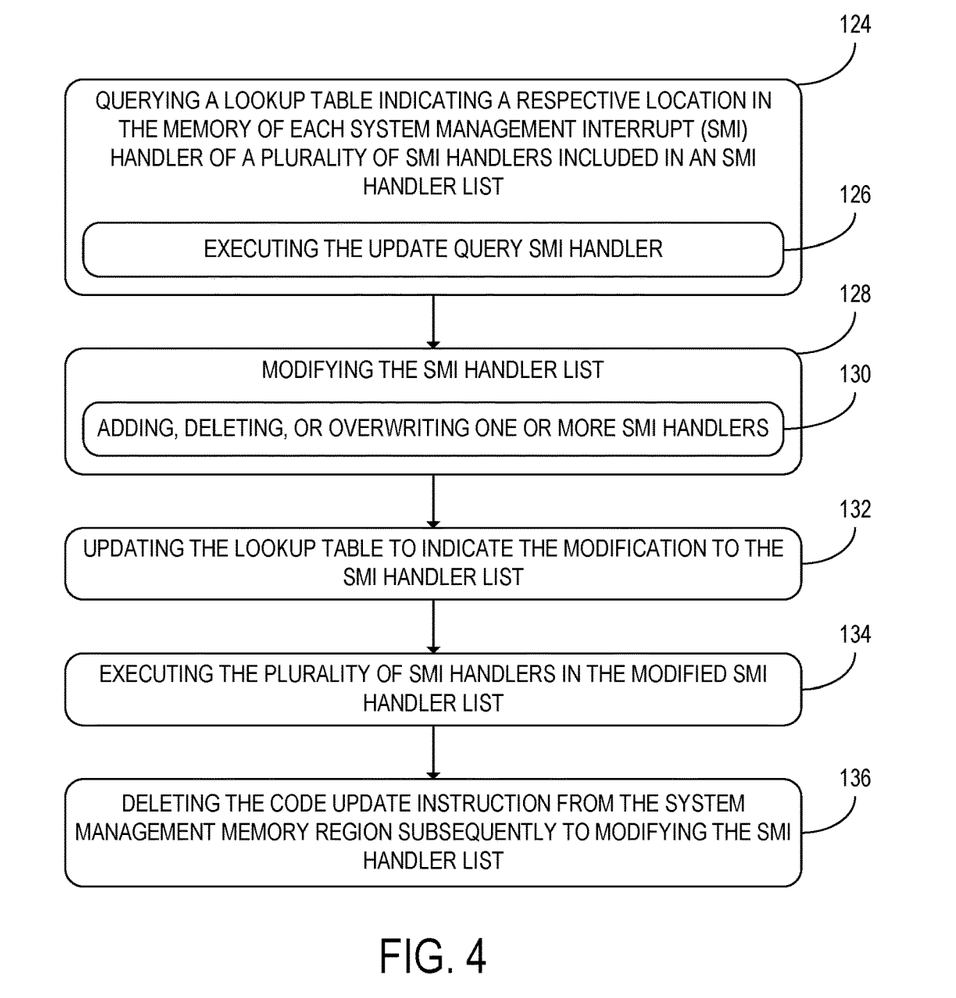
FIG. 4 shows additional steps that may be performed when performing the method of FIG. 3.

FIG. 4 shows additional steps of the method 100 that may be performed in embodiments in which performing the code update includes executing a plurality of SMI handlers. The plurality of SMI handlers may be included in an SMI handler list indicating each SMI handler configured to be executed by the processor system while in the SMM. The SMI handler list may further indicate an execution order of the plurality of SMI handlers. At step 124, the method 100 may further include querying a lookup table indicating a respective location in the memory of each SMI handler included in the SMI handler list. The lookup table may be queried when determining that the system management memory region includes the code update instruction. The lookup table may be stored in the memory. In some embodiments, the plurality of SMI handlers may include an update query SMI handler. In such embodiments, at step 126, querying the lookup table may include executing the update query SMI handler.

At step 128, the method 100 may further include, in some embodiments, modifying the SMI handler list. At step 130, modifying the SMI handler list may include adding, deleting, or overwriting one or more SMI handlers. In embodiments in which step 128 is performed, the method 100 may further include, at step 132, updating the lookup table to indicate the modification to the SMI handler list. For example, when one or more SMI handlers are overwritten at step 130, one or more respective handler overrides indicating that the one or more SMI handlers have been overwritten may be stored in the lookup table. Thus, the memory may store an indication the code update has been performed.

At step 134, the method 100 may further include, subsequently to modifying the SMI handler list, executing the plurality of SMI handlers in the modified SMI handler list. The plurality of SMI handlers may be executed in an order indicated in the SMI handler list. At step 136, the method 100 may further include deleting the code update instruction from the system management memory region subsequently to modifying the SMI handler list.

Figure 5:
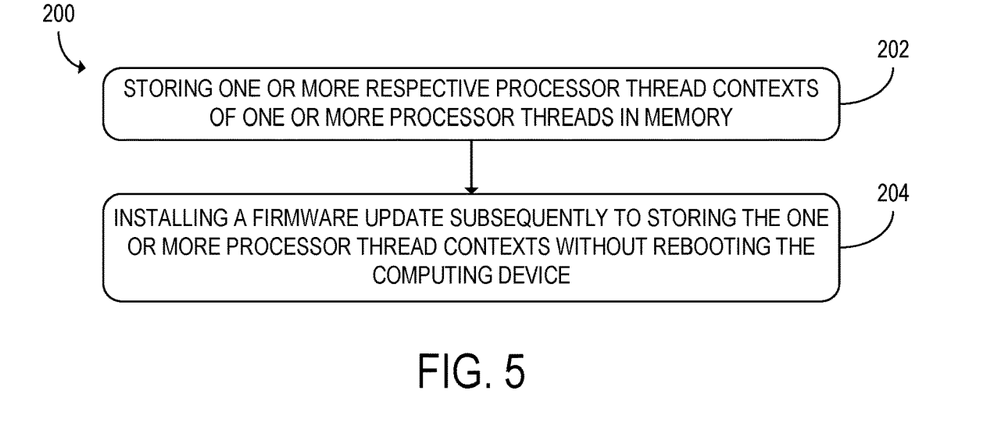
FIG. 5 shows a flowchart of another example method for performing a rebootless firmware update at a computing device, according to the embodiment of FIGS. 1A-1B.

FIG. 5 shows a flowchart of another example method 200 for performing a rebootless firmware update at a computing device. The computing device at which the method 200 is performed may be the computing device 10 of FIGS. 1A-1B or alternatively some other computing device. At step 202, the method 200 may include storing one or more respective processor thread contexts of one or more processor threads in memory. The one or more processor threads may instantiate one or more VMs. The respective processor thread context of each processor thread may encode a state of that processor thread at a particular point in time. By storing the one or more processor thread contexts, the respective states of the one or more processor threads may be retrieved after the rebootless firmware update is performed.

The method 200 may further include, at step 204, installing a firmware update subsequently to storing the one or more processor thread contexts without rebooting the computing device. It will be appreciated that the code update described above herein may also be referred to as a firmware update when the code update is applied to update code that is under control of firmware such as the BIOS. In such a case, the code update is a firmware update. The firmware update may be installed while the computing device is in an SMM. Installing the firmware update may include executing a plurality of SMI handlers while in the SMM. Installing the SMI update may additionally or alternatively include retrieving the firmware update from a system management memory region. After the firmware update has been performed, the one or more processor thread contexts may be retrieved from the memory and may resume execution.

The above-described systems and methods may be used to perform a code update in system management mode, quickly, without rebooting the computing device. This has the potential advantage of greatly reducing the downtime for a computing device that may be result due to the reboot process. In one example, the code update can be performed in 190 microseconds, and then the quiesced threads may resume execution, resulting in no perceptible performance lag for the users of the computing device. This can be particularly advantageous in server environments, when downtime required to reboot a server can take significantly longer, and where server processor time is particularly highly valued.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
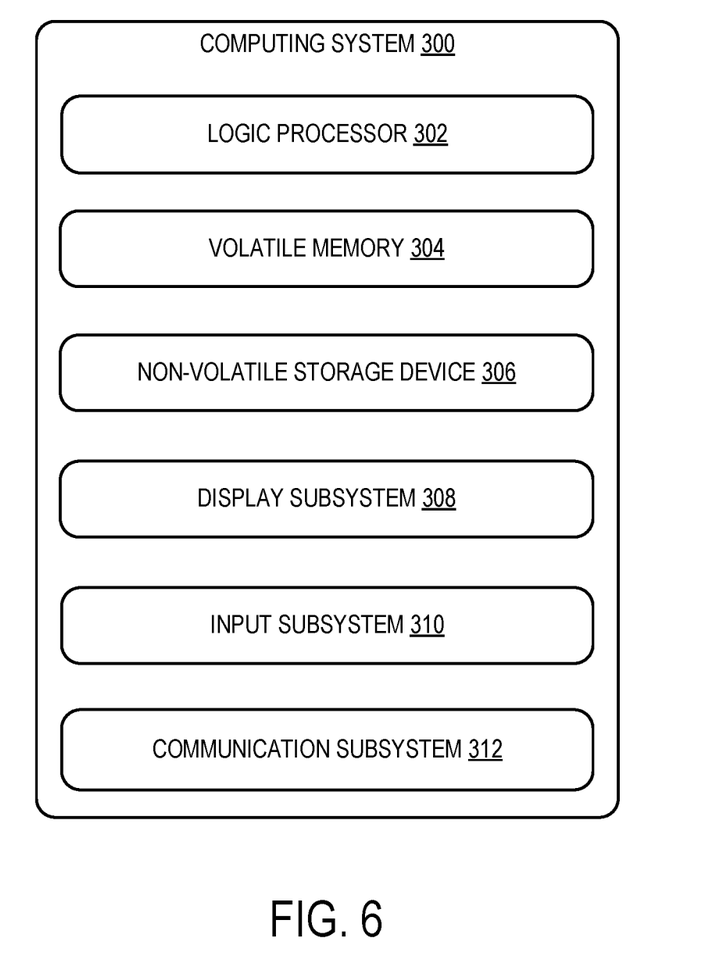
FIG. 6 shows a schematic view of an example computing environment in which the computing device of FIGS. 1A-1B may be enacted.

FIG. 6 schematically shows a non-limiting embodiment of a computing system 300 that can enact one or more of the methods and processes described above. Computing system 300 is shown in simplified form. Computing system 300 may embody the computing device 10 described above and illustrated in FIGS. 1A-1B. Computing system 300 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 6.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

According to one aspect of the present disclosure, a computing device is provided. The computing device may include memory including a system management memory region. The computing device may further include a processor system including a plurality of processor threads. The processor system may be configured to suspend execution of one or more processor threads of the plurality of processor threads. The processor system may be further configured to store one or more respective processor thread contexts of the one or more processor threads in the memory. The processor system may be further configured to enter a system management mode (SMM). The processor system may be further configured to determine that the system management memory region includes a code update instruction. The processor system may be further configured to perform a code update based on the code update instruction. The processor system may be further configured to exit the SMM. The processor system may be further configured to retrieve the one or more processor thread contexts from the memory. The processor system may be further configured to resume execution of the one or more processor threads without rebooting the computing device.

According to this aspect, the code update instruction may be an instruction to add or remove a system management interrupt (SMI) handler, reinitialize at least a part of a memory controller for the memory, change a multithreading setting, enable or disable a core of the processor system, or modify a memory usage model.

According to this aspect, when the processor system is in the SMM, the processor system may include a monarch thread configured to allocate one or more other SMM threads.

According to this aspect, the processor system may be further configured to execute one or more virtual machines concurrently with the SMM.

According to this aspect, performing the code update may include modifying a system management interrupt (SMI) handler list including a plurality of SMI handlers. Performing the code update may further include executing the plurality of SMI handlers in the modified SMI handler list.

According to this aspect, the processor system may be configured to modify the SMI handler list based on the code update instruction at least in part by adding, deleting, or overwriting one or more SMI handlers.

According to this aspect, the processor system may be configured to determine that the system management memory region includes the code update instruction at least in part by querying a lookup table indicating a respective location in the memory of each SMI handler.

According to this aspect, the SMI handler list may include an update query SMI handler. The processor system may be configured to query the lookup table at least in part by executing the update query SMI handler.

According to this aspect, the processor system may be further configured to delete the code update instruction from the system management memory region subsequently to modifying the SMI handler list.

According to this aspect, each SMI handler of the SMI handler list may include respective SMI handler metadata.

According to this aspect, the processor system may be configured to perform the code update in response to verifying a digital signature of the code update instruction.

According to another aspect of the present disclosure, a method for use with a computing device is provided. The method may include suspending execution of one or more processor threads of a plurality of processor threads executed by a processor system. The method may further include storing one or more respective processor thread contexts of the one or more processor threads in memory. The method may further include entering a system management mode (SMM). The method may further include determining that a system management memory region in the memory includes a code update instruction. The method may further include performing a code update based on the code update instruction. The method may further include exiting the SMM. The method may further include retrieving the one or more processor thread contexts from the memory. The method may further include resuming execution of the one or more processor threads without rebooting the computing device.

According to this aspect, the code update instruction may be an instruction to add or remove a system management interrupt (SMI) handler, reinitialize at least a part of the memory, change a multithreading setting, enable or disable a core of the processor system, or modify a memory usage model.

According to this aspect, the method may further include allocating one or more other processor threads using a monarch thread of the plurality of processor threads.

According to this aspect, the method may further include executing one or more virtual machines concurrently with the SMM.

According to this aspect, performing the code update may include modifying a system management interrupt (SMI) handler list including a plurality of SMI handlers. Performing the code update may further include executing the plurality of SMI handlers in the modified SMI handler list.

According to this aspect, determining that the system management memory region includes the code update instruction may include querying a lookup table indicating a respective location in the memory of each SMI handler.

According to this aspect, the method may further include deleting the code update instruction from the system management memory region subsequently to modifying the SMI handler list.

According to this aspect, each SMI handler of the SMI handler list may include respective SMI handler metadata.

According to another aspect of the present disclosure, a method for performing a rebootless firmware update at a computing device is provided. The method may include storing one or more respective processor thread contexts of one or more processor threads in memory. The method may further include installing a firmware update subsequently to storing the one or more processor thread contexts without rebooting the computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
   memory including a system management memory region; and
   a processor system including a plurality of processor threads, wherein the processor system is configured to:
      suspend execution of one or more processor threads of the plurality of processor threads;
      store one or more respective processor thread contexts of the one or more processor threads in the memory;
      enter a system management mode (SMM), wherein a monarch thread of the plurality of processor threads is designated when entering the SMM;
      determine that the system management memory region includes a code update instruction at least in part by:
         querying a lookup table indicating a respective location in the memory of each of a plurality of system management interrupt (SMI) handlers included in an SMI handler list, wherein each SMI handler of the SMI handler list includes respective SMI handler metadata, and wherein the respective SMI handler metadata includes a respective SMI reason indicating one or more predetermined conditions under which the SMI handler is configured to be executed;
         determining, for each SMI handler, whether the respective SMI reason is satisfied based on the respective SMI handler metadata of the SMI handler; and
         responsive to determining that the SMI reason is satisfied for a first subset of SMM threads and is not satisfied for a second subset of SMM threads, assigning the first subset of SMM threads to each SMI handler for which the SMI reason is satisfied, while not assigning the second subset of SMM threads to each SMI handler for which the SMI reason is not satisfied;
      based on the assigned first subset of SMM threads and the unassigned second subset of SMM threads, perform a code update based on the code update instruction, wherein performing the code update includes:
         modifying the SMI handler list with information about the assigned first subset of SMM threads; and
         executing the plurality of SMI handlers in the modified SMI handler list, using the monarch thread and the one or more other allocated SMM threads;
      exit the SMM;
      retrieve the one or more processor thread contexts from the memory; and
      resume execution of the one or more processor threads without rebooting the computing device.

2. The computing device of claim 1, wherein the code update instruction is an instruction to:
   add or remove a system management interrupt (SMI) handler;
   reinitialize at least a part of a memory controller for the memory;
   change a multithreading setting;
   enable or disable a core of the processor system; or
   modify a memory usage model.

3. The computing device of claim 1, wherein the processor system is further configured to execute one or more virtual machines concurrently with the SMM.

4. The computing device of claim 1, wherein the processor system is configured to modify the SMI handler list based on the code update instruction at least in part by adding, deleting, or overwriting one or more SMI handlers.

5. The computing device of claim 1, wherein:
   the SMI handler list includes an update query SMI handler; and
   the processor system is configured to query the lookup table at least in part by executing the update query SMI handler.

6. The computing device of claim 1, wherein the processor system is further configured to delete the code update instruction from the system management memory region subsequently to modifying the SMI handler list.

7. The computing device of claim 1, wherein the processor system is configured to perform the code update in response to verifying a digital signature of the code update instruction.

8. A method for use with a computing device, the method comprising:
   suspending execution of one or more processor threads of a plurality of processor threads executed by a processor system;
   storing one or more respective processor thread contexts of the one or more processor threads in memory;
   entering a system management mode (SMM), wherein a monarch thread of the plurality of processor threads is designated when entering the SMM;
   determining that a system management memory region in the memory includes a code update instruction at least in part by:
      querying a lookup table indicating a respective location in the memory of each of a plurality of system management interrupt (SMI) handlers included in an SMI handler list, wherein each SMI handler of the SMI handler list includes respective SMI handler metadata, and wherein the respective SMI handler metadata includes a respective SMI reason indicating one or more predetermined conditions under which the SMI handler is configured to be executed;
      determining, for each SMI handler, whether the respective SMI reason is satisfied based on the respective SMI handler metadata of the SMI handler; and
      responsive to determining that the SMI reason is satisfied for a first subset of SMM threads and is not satisfied for a second subset of SMM threads, assigning the first subset of SMM threads to each SMI handler for which the SMI reason is satisfied, while not assigning the second subset of SMM threads to each SMI handler for which the SMI reason is not satisfied;
   based on the assigned first subset of SMM threads and the unassigned second subset of SMM threads, performing a code update based on the code update instruction, wherein performing the code update includes:
      modifying the SMI handler list with information about the assigned first subset of SMM threads; and
      executing the plurality of SMI handlers in the modified SMI handler list using the monarch thread and the one or more other allocated SMM threads;
   exiting the SMM;

retrieving the one or more processor thread contexts from the memory; and resuming execution of the one or more processor threads without rebooting the computing device.

9. The method of claim 8, wherein the code update instruction is an instruction to:

add or remove a system management interrupt (SMI) handler;

reinitialize at least a part of the memory;

change a multithreading setting;

enable or disable a core of the processor system; or modify a memory usage model.

10. The method of claim 8, further comprising executing one or more virtual machines concurrently with the SMM.

11. The method of claim 8, further comprising deleting the code update instruction from the system management memory region subsequently to modifying the SMI handler list.

\* \* \* \* \*